United States Patent [19]

Stimpfl

[11] Patent Number: 5,123,543
[45] Date of Patent: Jun. 23, 1992

[54] APPARATUS FOR SEPARATING ANGEL HAIR

[75] Inventor: Christof Stimpfl, Vogt, Fed. Rep. of Germany

[73] Assignee: Waeschle Maschinenfabrik GmbH, Ravensburg, Fed. Rep. of Germany

[21] Appl. No.: 622,817

[22] Filed: Dec. 5, 1990

[30] Foreign Application Priority Data

Dec. 8, 1989 [DE] Fed. Rep. of Germany ....... 3940669

[51] Int. Cl.$^5$ .............................................. B07B 13/16
[52] U.S. Cl. ................................... 209/616; 209/629; 209/643; 209/940
[58] Field of Search ............... 209/233, 235, 240, 250, 209/255, 257, 606, 607, 615, 616, 659, 671, 625, 627, 628, 629, 632, 643, 688, 924, 925, 940

[56] References Cited

U.S. PATENT DOCUMENTS

| | | | |
|---|---|---|---|
| 781,616 | 1/1905 | Owens et al. | 209/607 |
| 4,123,289 | 10/1978 | Bourgeois | 209/688 X |
| 4,207,986 | 6/1980 | Cerroni | 209/925 X |
| 4,251,355 | 2/1981 | Nelson et al. | 209/241 |
| 4,265,151 | 5/1981 | Carruth et al. | 209/616 |
| 4,484,684 | 11/1984 | Tetreault | 209/616 |
| 4,909,498 | 2/1990 | Smith | 209/659 X |
| 5,009,331 | 4/1991 | Smith | 209/615 |

FOREIGN PATENT DOCUMENTS

| | | | |
|---|---|---|---|
| 3618050 | 12/1987 | Fed. Rep. of Germany | 209/616 |
| 3940669 | 10/1990 | Fed. Rep. of Germany | 209/616 |
| 54-112066 | 9/1979 | Japan | 209/616 |
| 0244168 | 9/1969 | U.S.S.R. | 209/688 |

Primary Examiner—Michael S. Huppert
Assistant Examiner—Edward M. Wacyra
Attorney, Agent, or Firm—Henry M. Feiereisen

[57] ABSTRACT

Apparatus for separating angel hair from bulk material includes a hollow drum which is partly immersed in the flow of bulk material and rotates in such a manner that the immersed part of the drum moves in opposite direction to the bulk material flow. The drum has an outer jacket which is provided with circumferentially spaced bores through which one end of spikes projects, with their other end being swingably mounted to a bearing member. The bearing member has a center axis which is offset to the axis of rotation of the drum so that the spikes project beyond the outer surface of the drum at their bulk material facing side while being retracted at the bulk material distant side of the drum. Thus, during a revolution of the drum, the spikes gradually move in and out of the drum.

14 Claims, 3 Drawing Sheets

APPARATUS FOR SEPARATING ANGEL HAIR

BACKGROUND OF THE INVENTION

The present invention refers to an apparatus for separating angel hair, and in particular to a separator of the type having a drum with externally arranged spikes.

During the course of a conventional pneumatic, free-flowing conveyance of bulk material, especially granular plastic material, the formation of filamentous abrasions is frequently observed which is called "angel hair" and may have dimensions of up to one meter length. This angel hair leads to considerable troubles or disturbances during discharge of the bulk material from silos and during sacking and further processing and thus must be removed. One conventional method proposes to screen the bulk material. This method is, however, disadvantageous because of the great dimensions of utilized screens. Another method proposes the use of air separators. However, as it turns out, such air separators could not produce satisfactory degrees of separation.

In separators using a spiked drum, the drum partly immerses in the bulk material flow and is rotated in such a manner that the immersed part of the drum rotates in opposite direction to the bulk material flow so as to allow the spikes to remove angel hair from the bulk material. A drawback of a separator of this type is the difficulty to remove angel hair clinging to the spikes at the circumference of the drum. Proposals to remove angel hair from the spikes by sucking off, blowing off or brushing off were not satisfactory.

SUMMARY OF THE INVENTION

It is thus an object of the present invention to provide an improved apparatus for separating angel hair obviating the afore-stated drawbacks.

In particular, it is an object of the invention to provide an improved apparatus for separating angel hair which is combed-out by and partly wound about the spikes and can easily and continuously be removed.

These objects and others which will become apparent hereinafter are attained in accordance with the present invention by providing a bearing member which is eccentrically arranged within a hollow drum and provided with spikes having one end swingably mounted to the bearing member and another end extending in bores of the drum so that the spikes project beyond the outer surface of the drum at the bulk material facing side of the drum while being retracted at the bulk material distant side thereof.

According to the teachings of the invention, the spikes are not rigidly connected about the outer surface of the drum but are extended into the interior of the drum through bores in the outer jacket thereof and swingably mounted relative to the outer drum surface so that the spikes can move in and out. Thus, the outer drum surface serves as a stripping member during in and out movement of the spikes.

According to a preferred embodiment of the present invention, a separator includes a housing with a bulk material inlet which extends eccentrically to the drum so that the flow of bulk material is channelled in the direction of a gap defined between the bulk material facing side of the drum and the opposing housing wall, a bulk material outlet, and a discharge outlet through which angel hair is discarded at the bulk material distant side of the drum. Preferably, the inlet and the outlet define a common axis, with the inlet being at the top and the outlet being at the bottom of the housing. The discharge outlet preferably branches off slantingly upwards from the common axis because angel hair may then be discharged according to the principle of air separation without containing granular components.

Preferably, the free ends of the spikes are of reduced diameter at least over a length corresponding to the thickness of the outer jacket of the drum to allow compressed air supplied into the interior of the hollow drum to escape through the bores at the bulk material distant side of the drum to thereby support the removal of angel hair. Thus, when spikes occupy their retracted position, compressed air can be blown through the bores while in their jutted position, in which the spikes protrude beyond the outer surface of the drum for removing angel hair from the passing flow of bulk material, the bores are completely closed by the spikes so that compressed air is prevented from escaping.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
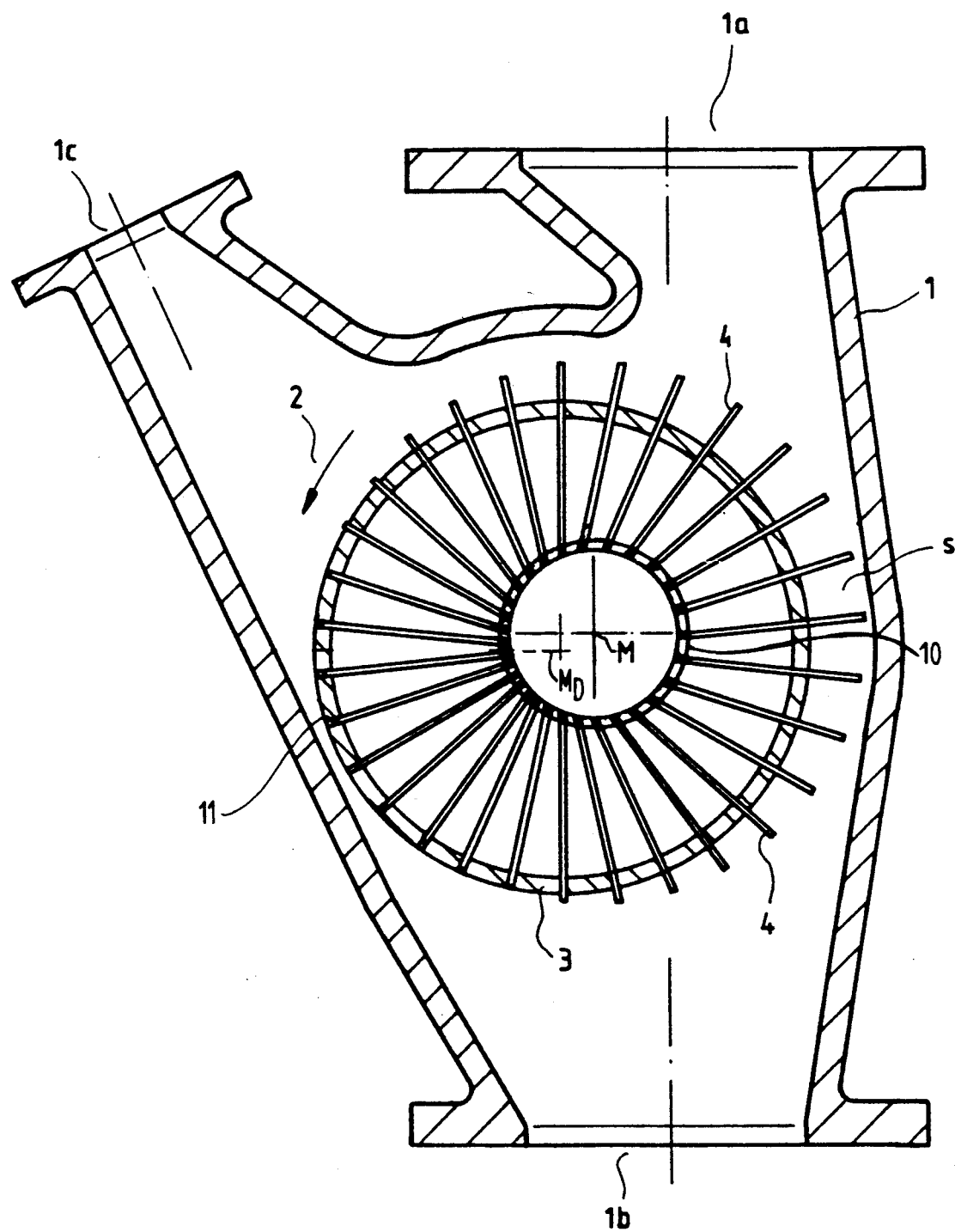
FIG. 1 is a schematic, sectional view of one embodiment of a separator in accordance with the present invention.

Referring now to the drawing, and in particular to FIG. 1, there is shown a schematic, sectional view of one embodiment of a separator in accordance with the present invention, including a housing 1 with a top inlet 1a and a coaxial bottom outlet 1b. Branching off slantingly upwards is a discharge outlet 1c through which filamentous abrasions or angel hair are removed. Arranged inside the housing 1 is a hollow drum or cylinder 3 which is rotatable in direction of arrow 2. The drum 3 and its center $M_D$ is oriented eccentrically relative to the inlet 1a so that the bulk material flow entering the housing 1 is channeled in direction of a gap s which is defined between the outer drum surface and the opposing wall of the housing 1.

Accommodated within the drum 3 is a bearing member 10 which has a geometric center M offset relative to the drum center $M_D$ in direction of the gap s by about half the smallest width of the gap s, i.e. by about half the smallest distance between the outer drum surface and the opposing wall of the housing 1. Preferably, the eccentric bearing member 10 may be a pipe which extends between and is securely fixed to the opposing end faces of the drum 3. Persons skilled in the art will recognize that such design is merely one example of a bearing member according to the invention.

Swingably mounted to the bearing member 10 about its circumference is the inner end of a number of rods or spikes 4 which extend through the hollow of the drum 3, with their outer or free end extending in respective circumferential bores 11 which traverse the outer drum jacket. By eccentrically arranging the bearing member 10 relative to the center $M_D$ of the drum 3 as shown in FIG. 1, the spikes 4 protrude in the area of the gap s beyond the outer surface of the drum by an amount which is almost equal to the smallest distance between the outer drum surface and the opposing wall of the housing 1. With continuous rotation of the drum 3, the spikes 4 gradually retract into the bores 11 until approximately being at least flush with the outer drum surface in the circumferential area remote to the gap s. Thus, during a revolution of the drum 3, the spikes 4 gradually move in and out of the bores 11.

When entering the housing 1 of the separator through inlet 1a the bulk material passes over the ascending surface of the rotating drum 3 and exits through outlet 1b via the gap s, with the jutting spikes 4, which rotate in opposite direction to the flow of the bulk material, removing or combing out angel hair from the bulk material. The angel hair clings or adheres to the spikes 4 of the drum 1 and are transported towards the discharge outlet 1c through which angel hair is then removed.

Figure 2:
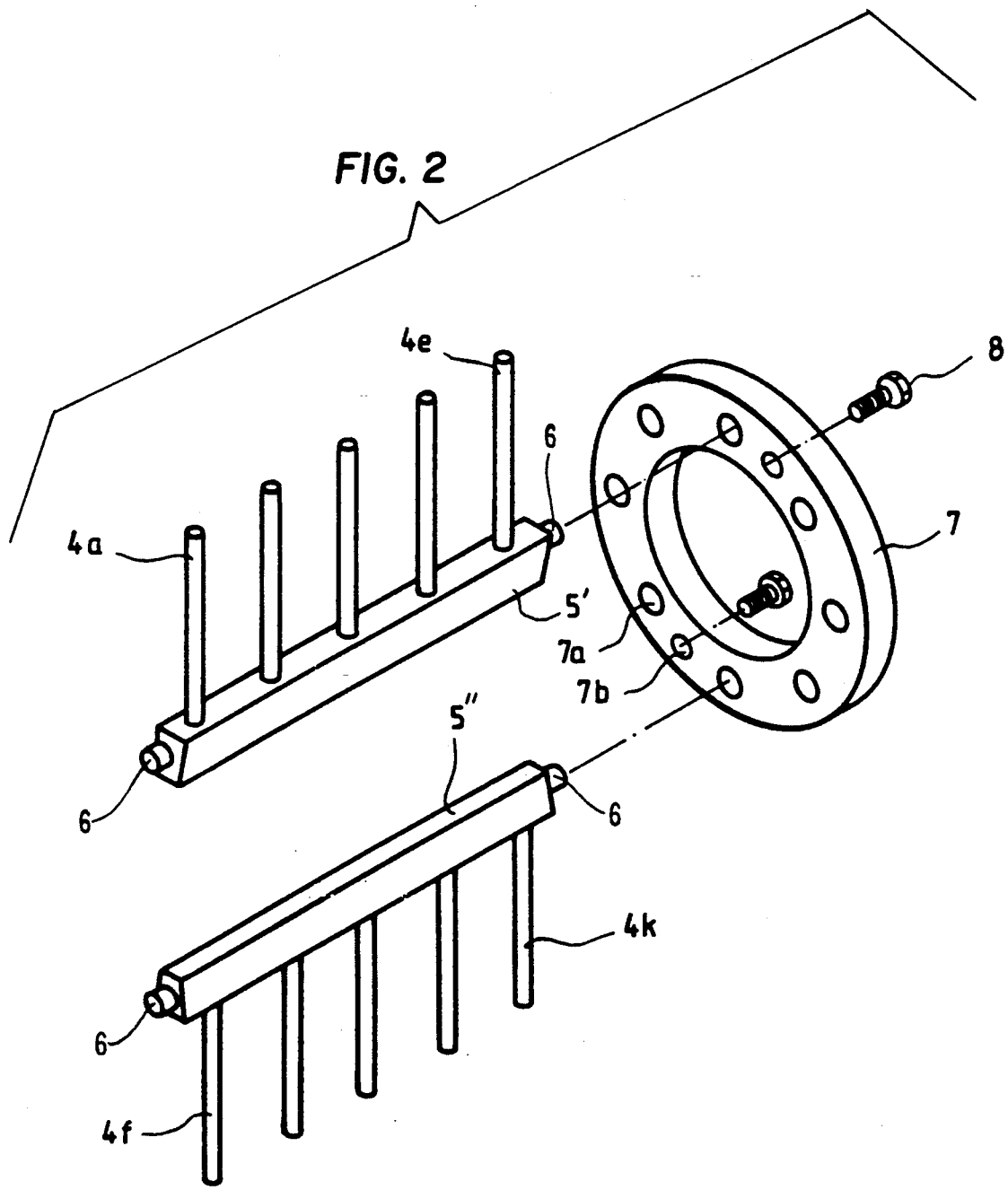
FIG. 2 is a fragmentary perspective view of the separator in exploded illustration, showing in detail the support of rows of spikes within the interior of the drum.
Figure 3:
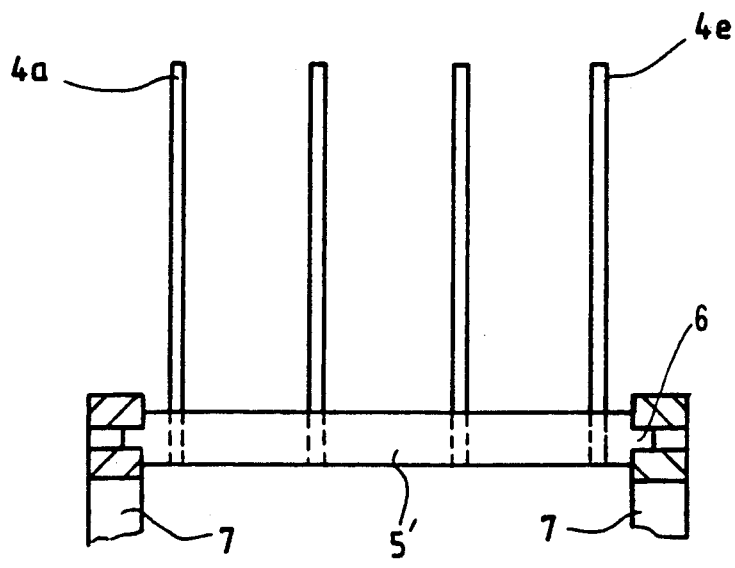
FIG. 3 is a fragmentary side view, partly sectional, of one row of spikes and the support thereof.
Figure 4:
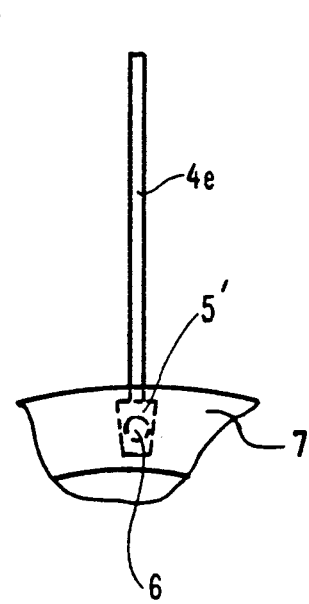
FIG. 4 is a front view of the illustration of FIG. 3.

Turning now to FIG. 2, there is shown a fragmentary, exploded illustration of a further embodiment of a separator in accordance with the present invention, with the drum being omitted for sake of simplicity. As shown in FIG. 2, rows of spikes 4, such as spikes 4a to 4e and spikes 4f to 4k are respectively positioned in parallel alignment to the generatrix of the drum on a common support rail 5', 5". Each support rail 5', 5" is provided at its opposing ends with a journal 6 which is swingably mounted in a respective bore 7a of a bearing ring 7, as illustrated in FIGS. 3 and 4. Each bearing ring 7 is further provided with threaded holes 7b for secure connection with the respective end face of the hollow drum (not shown) by means of screws 8 (only one exemplary screw 8 is shown in FIG. 2).

The spikes 4a to 4e, 4f to 4k traverse bores in the drum jacket in a same manner as described in FIG. 1. It should be noted that for ease of illustration FIG. 2 shows only two rows of spikes 4. During operation, i.e. rotation of the drum 3, the eccentric arrangement of the bearing rings 7 allows the spikes 4 to project beyond the outer drum surface in the area of gap s while being withdrawn in the gap distant area.

It will be appreciated that the type of swingable or tiltable eccentric support of the spikes 4 is shown by way of example only, and may certainly differ from the described embodiments without departing from the spirit of the invention. For example, it is possible to swingably mount the common support rails 5' and 5" directly and eccentrically to the end faces of the drum. Alternatively, the bearing rings 7 need not necessarily be screwed to the end walls of the drum but may be rotatably received in a circular recess which is provided in each end wall and arranged eccentrically to the drum axis.

Figure 5:
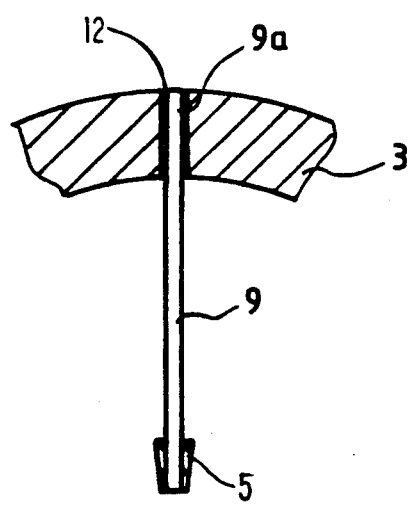
FIG. 5 is a partly sectional fragmentary view of another embodiment of a separator in accordance with the present invention, illustrating in detail one spike and its traversal through the outer jacket of the drum.

Turning now to FIG. 5, there is shown a partly sectional fragmentary view of a variation of the separator as shown in FIG. 1, illustrating in detail one exemplary spike 9 and its traversal through the bore 11 in the outer surface of the drum 3. As can be seen from FIG. 5, the support rail distant end 9a of each spike 9 is of reduced diameter over a length at least corresponding to the thickness of the outer jacket of the drum 3 so that a space 12 is exposed between the spike end 9a and the inside wall of the pertaining bore 11 when the spike 9 is in a retracted or withdrawn position. During rotation of the drum 3 in direction of arrow 2, compressed air introduced into the interior of the drum 3 escapes through those bores 11 in which the spikes 4 occupy their retracted position. Thus, when bulk material flows past the ascending portion of the drum 3 through gap s (FIG. 1), angel hair is taken up by the spikes 4 and moved toward the discharge outlet 1c. Since in the area of the discharge outlet 1c, the spikes 4 increasingly are pulled inside, compressed air is blown through the space 12 between the respective spikes 9 and the inside wall of the bores 11 to further support the removal of angel hair through the discharge outlet 1c.

Persons skilled in the art will recognize that the discharge of combed out and removed angel hair from the discharge outlet 1c is suitably done by suction devices which do not form part of the invention and thus are not shown in detail. Alternatively, the discharge may also be obtained by providing a slight overpressure in the area of the outlet 1b because in this case the bulk material enters the inlet 1a by way of gravity so that air will preferably exit through the discharge outlet 1c and entrain the removed angel hair.

Suitably, at least one end face of the drum is provided with coupling means for allowing connection of a further drum of a same type. In this manner, the separator according to the invention can be used for a wide range of bulk material throughputs per time unit.

While the invention has been illustrated and described as embodied in an apparatus for separating angel hair, it is not intended to be limited to the details shown since various modifications and structural changes may be made without departing in any way from the spirit of the present invention.

What is claimed as new and desired to be protected by Letters Patent is set forth in the appended claims:

1. Apparatus for separating angel hair from a flow of bulk material; comprising:

a hollow drum partly immersed in the flow of bulk material and rotatable in such a manner that the immersed part of the drum moves in opposite direction to the flow of bulk material, said drum having an outer jacket provided with bores spaced about the circumference thereof; and bearing means eccentrically accommodated within said drum and provided with spikes having one end swingably arranged relative to said bearing means and another end extending in said bores of said drum such that said spikes project beyond said drum at the side facing the flow of bulk material while being retracted at the side distant to the flow of bulk material; and a housing having a housing wall and accommodating said drum such that a gap is defined between said housing wall and said side of said drum facing the flow of bulk material, said housing including a bulk material inlet extending eccentrically to said drum so that the flow of bulk material is channelled in direction of said gap, a bulk material outlet, and discharge outlet through which angel hair is discarded at the bulk material distant side of said drum.

2. Apparatus as defined in claim 1 wherein said drum rotates about an axis of rotation, said bearing means being defined by a center axis which is shifted relative to said axis rotation in a plane perpendicular to the flow of bulk material.

3. Apparatus as defined in claim 1 wherein said drum defines a generatrix, and spikes being arranged in form of comb-type rows extending parallel to the generatrix of said drum.

4. Apparatus as defined in claim 3, and further comprising a support rail for securely supporting a comb-type row of spikes, said support rail being swingably mounted to said bearing means.

5. Apparatus as defined in claim 4 wherein a plurality of such support rails is provided, said bearing means including two bearing rings, respectively supporting the same axial ends of said support rails.

6. Apparatus as defined in claim 5 wherein said bearing rings are non-rotatably secured to said drum.

7. Apparatus as defined in claim 6 wherein said drum has opposing end faces, said bearing rings being screwed to said end faces of said drum.

8. Apparatus as defined in claim 1 wherein said drum rotates about an axis of rotation, said bearing means being defined by a center axis which is shifted relative to said axis of rotation in a plane perpendicular to the flow of bulk material and is shifted relative to said axis of rotation by about half the smallest distance between said outer jacket of said drum facing the bulk material flow and said opposing housing wall.

9. Apparatus as defined in claim 1 wherein the other end of said spikes is of reduced diameter to allow compressed air supplied into the interior of said hollow drum to escape through said bores at the side of said drum being distant to the bulk material flow for supporting removal of angel hair.

10. Apparatus as defined in claim 9 wherein said outer jacket has a thickness, said other end of said spikes being of reduced diameter at least over the thickness of said jacket of said drum.

11. Apparatus as defined in claim 1, and further comprising coupling means provided at at least one end face of said drum for allowing connection of a further drum of a same type.

12. Apparatus for separating angel hair from a flow of bulk material; comprising:
  a hollow drum partly immersed in the flow of bulk material and rotatable in such a manner that the immersed part of the drum moves in opposite direction to the flow of bulk material, said drum having an outer jacket provided with bores spaced about the circumference thereof;
  bearing means eccentrically accommodated within said drum and provided with spikes having one end swingably arranged relative to said bearing means and another end extending in said bores of said drum such that said spikes project beyond said drum at the side facing the flow of bulk material while being retracted at the side distant to the flow of bulk material;
  a housing having a housing wall and accommodating said drum such that a gap is defined between said housing wall and said side of said drum facing the flow of bulk material, said housing including a bulk material inlet extending eccentrically to said drum so that the flow of bulk material is channelled in direction of said gap, a bulk material outlet, and a discharge outlet through which angel hair is discarded at the bulk material distant side of said drum, said inlet and said bulk material outlet defining a common axis, with said discharged outlet branching off slantingly upwards from said common axis.

13. Apparatus for separating angel hair from a flow of bulk material; comprising:
  a hollow drum partly immersed in the flow of bulk material and rotatable in such a manner that the immersed part of the drum moves in opposite direction to the flow of bulk material, said drum having an outer jacket provided with bores spaced about the circumstances thereof;
  bearing means eccentrically accommodated within said drum and provided with spikes having one end swingably arranged relative to said bearing means and another end extending in said bores of said drum such that said spikes project beyond said drum at the side facing the flow of bulk material while being retracted at the side distant to the flow of bulk material, said other end of said spikes being of reduced diameter to allow compressed air supplied into the interior of said hollow drum to escape through said bores at the side of said drum being distant to the flow of bulk material for supporting removal of angel hair.

14. Apparatus as defined in claim 13 wherein said outer jacket has a thickness, said other end of said spikes being of reduced diameter at least over the thickness of said jacket of said drum.

* * * * *